United States Patent [19]

Bastian et al.

[11] Patent Number: 4,489,638
[45] Date of Patent: Dec. 25, 1984

[54] QUICK CONVERSION MISSILE SYSTEM FOR WIDEBODY AIRCRAFT

[75] Inventors: Thomas W. Bastian, Fullerton; Charles W. Schertz, Claremont, both of Calif.

[73] Assignee: General Dynamics, Pomona Division, Pomona, Calif.

[21] Appl. No.: 474,994

[22] Filed: Mar. 14, 1983

[51] Int. Cl.³ .............................................. F41F 3/06
[52] U.S. Cl. .................................. 89/1.815; 89/1.801
[58] Field of Search .................... 89/1.815, 1.818, 1.8, 89/1.801, 1.803, 1.804

[56] References Cited

U.S. PATENT DOCUMENTS

| | | | |
|---|---|---|---|
| 2,566,390 | 9/1951 | Weber | 89/1.804 |
| 2,709,947 | 6/1955 | Woods | 89/1.815 |
| 2,731,885 | 1/1956 | Nolan | 89/1.815 |
| 2,789,470 | 4/1957 | Bronson | 89/1.803 |
| 2,803,168 | 8/1957 | Robert et al. | 89/1.803 X |
| 2,826,120 | 3/1958 | Lang et al. | 89/1.803 X |
| 2,845,004 | 7/1958 | Johnson | 89/1.815 |
| 2,938,434 | 5/1960 | Myron | 89/1.815 |
| 2,973,691 | 3/1961 | Goldsmith | 89/1.801 |
| 2,989,899 | 6/1961 | Siegel et al. | 89/1.818 X |
| 3,534,653 | 10/1970 | Specht et al. | 89/1.816 X |
| 3,583,277 | 6/1971 | Crockett | 89/1.8 |
| 4,012,985 | 3/1977 | Magnusson | 89/1.818 |
| 4,040,334 | 8/1977 | Smethers, Jr. | 89/1.804 |
| 4,106,389 | 8/1978 | Walley | 89/1.815 |
| 4,208,949 | 6/1980 | Boilsen | 89/1.801 |
| 4,256,012 | 3/1981 | Cowart et al. | 89/1.819 X |
| 4,318,328 | 3/1982 | Rona | 89/1.815 |
| 4,333,384 | 6/1982 | Arnold | 89/1.815 X |
| 4,409,880 | 10/1983 | Fetterly | 89/1.819 |

*Primary Examiner*—David H. Brown
*Attorney, Agent, or Firm*—Henry M. Bissell; Edward B. Johnson

[57] ABSTRACT

A missile launching system adapted for installation in a standard commercial aircraft without modification of the aircraft structure. The system comprises a plurality of frame members, linear tracks which are movable longitudinally relative to the frame members, a plurality of launch tubes for storing the missiles, an exit port for installation in an pre-established aircraft fuselage opening, and associated equipment for selectively launching the missiles from the launch tubes through the exit port. The entire system is assembled from individual components, all of which are sized to be placed on board the aircraft through a standard passenger door opening. In preparation for installing the system in a commercial aircraft, the passenger seats and related equipment conventionally installed in the interior of such an aircraft are removed. The frame members of the system are then mounted to the standard seat tracks in the floor of the aircraft. The remaining portions of the system are thereafter assembled and installed on the frame. The frame is inclined to support the launch tubes at an angle extending upward and forward so that when a missile is ejected from the launch tube, it is given a trajectory which carries it clear of the aircraft wing and empennage.

30 Claims, 11 Drawing Figures

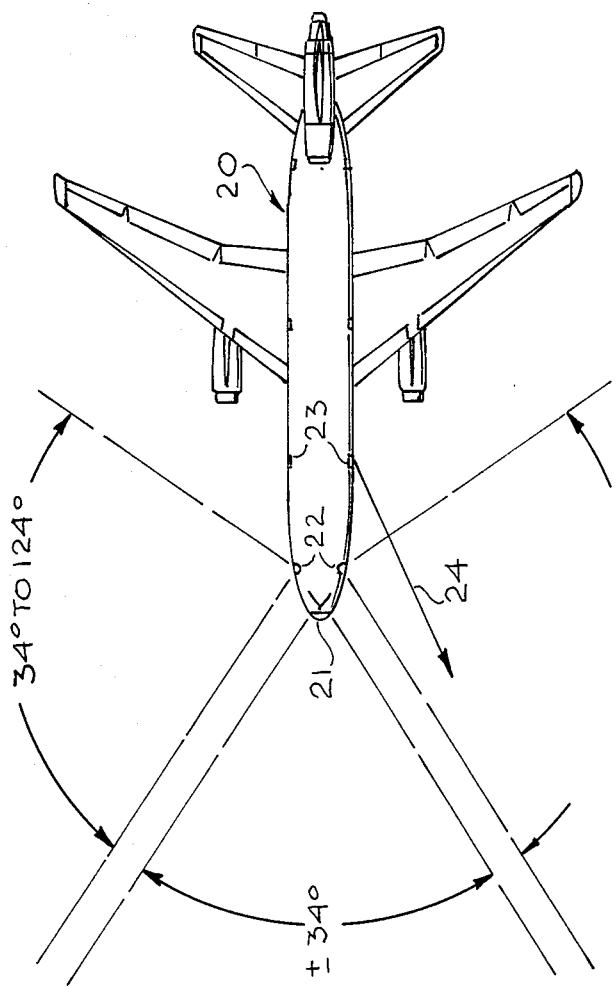
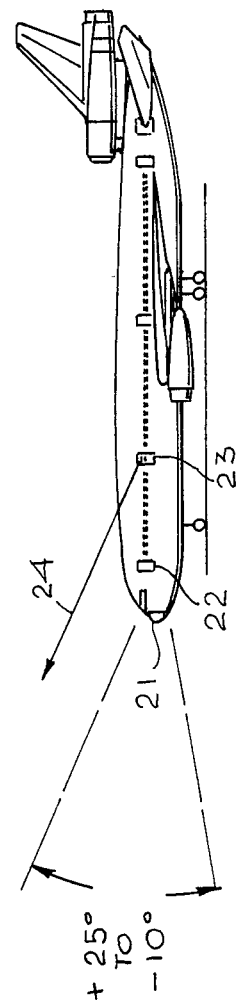
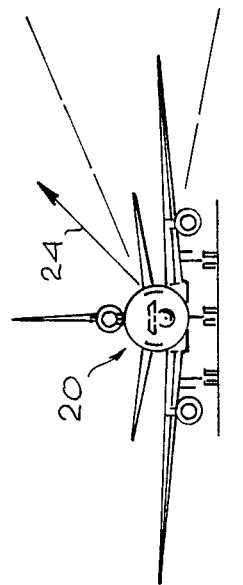

QUICK CONVERSION MISSILE SYSTEM FOR WIDEBODY AIRCRAFT

BACKGROUND OF THE INVENTION

1. Field of the Invention

The present invention relates generally to a missile launching system which may be employed in a widebody commercial aircraft, and more particularly to a missile launcher system which provides the capability of launching a plurality of tube launched missiles from the sides of the aircraft.

2. Description of the Prior Art

Heretofore, a variety of missile launching systems have been devised for use in military and commercial aircraft. Prior missile launching systems have included methods for deploying missiles from the tail section of the aircraft, or through a launching arrangement which ejects the missiles from the front of the aircraft by means of a gas ejection system. Other systems have included vertical and/or horizontal racks which deploy missiles from bomb bay areas or from the sides of the aircraft by extending the racks and missiles outside the aircraft for launching. Rotary rack arrangements have been designed for deploying missiles and rockets along with conventional wing-mounted launchers employed in military aircraft.

Some prior launcher designs have employed rotary racks which store the missiles and which are transferred to a set of parallel tracks which allow ejection of the missile from the front or side of the aircraft. In U.S. Pat. No. 4,208,949 of Boilsen, a plurality of cruise missiles are carried for launching from a converted widebody aircraft. The missiles are individually mounted in a "carousel" arrangement of rotary racks, each rack in turn being moved to a special launch door opening in the aft side of the fuselage and activated to eject missiles individually through the opening in an outward and downward direction through the downwash from the wing to avoid the empennage surfaces of the aircraft.

U.S. Pat. No. 4,040,334 of Smethers, Jr., shows a forwardly launched missile system which also incorporates a rotary rack to store the missiles. Smethers, Jr. incorporates a huge revolver mechanism for ICBMs with the "barrel" of the revolver constituting a single launch tube which extends internally of the aircraft and terminates at an opening in the nose which is closed in normal flight operation by a clam shell door arrangement.

U.S. Pat. Nos. 2,803,168 of Robert et al and 2,845,004 of Johnson disclose vertical and horizontal rack launcher systems. U.S. Pat. No. 2,826,120 of Lang et al describes a rotary rack arrangement while U.S. Pat. No. 3,534,653 of Specht et al shows a launch tube arrangement allowing missile launch in a plurality of directions.

While these patents describe a variety of systems for launching missiles or bombs from aircraft, no missile system is known in the prior art which may readily mounted in a standard widebody commercial aircraft without major structural or permanent modification to the aircraft.

SUMMARY OF THE INVENTION

In brief, arrangements in accordance with the present invention provide a missile launching system which may be readily installed and used in a commercial widebody jetliner, or similar aircraft. The interior of the aircraft is stripped of all seats and other conventional items, and the missile launching system is installed on the floor of the passenger compartment, secured to the standard tracks provided for anchoring the seats. The system is installed such that the missiles may be launched through exit port arrangements adapted to fit in the positions occupied by the aircraft doors. In addition, an avionics system is provided which identifies targets and controls the launching of the missiles from the aircraft.

One particular arrangement in accordance with the invention comprises an inclined frame disposed for mounting on the floor of the aircraft compartment and having slidable track apparatus coupled to bearing blocks mounted on the frame. A plurality of launch tubes disposed in a contiguous planar arrangement are attached to the track apparatus so that the tubes face forward and at an angle to the side along a direction defined by the incline of the frame. An exit port panel is disposed in the fuselage of the aircraft in a position where the door normally would be. The exit port panel has an internal and an external portion, with a valve arrangement disposed between the two portions. A slidable seal is coupled to the internal portion of the exit port which slides over the end of a launch tube to seal the launch tube for ejection of a missile. A pressure accumulator is coupled to the rear end of each of the launch tubes for pressurizing the interior of the end of the tube in order to eject a missile from the tube. A drive mechanism is provided which slides the tracks along the frame to sequentially align the launch tubes with the exit port. Thus, the missile system is capable of sequentially launching a series of missiles through the exit port.

An avionics system to be used with the present invention comprises a transmitter which is installed in the forward portion of the passenger compartment. The transmitter is coupled to a plurality of radar antennas disposed in the nose area of the aircraft and in the forward door areas on each side, utilizing bulkhead arrangements containing the two side antennas. An automatic control system controls the operation of the launcher by automatically advancing the track apparatus to successively fire the missiles in response to signals from the avionics system indicating acquisition of targets. Also, this control system controls the motion of the sliding seal arrangement and the operation of the gas ejection system. The avionics system tracks and identifies targets and directs the missiles toward selected targets.

In one particular arrangement in accordance with the invention two levels of missile launch tubes are employed, together with two exit ports, one above the other. The inclined support frame comprises a plurality of individual slanted frame members, each being fastened to the floor tracks which normally anchor the passenger seats. A pair of bearing blocks is mounted on each of the frames near the upper and lower ends, respectively, of the inclined face. Mounted in the bearing blocks are two sliding longitudinal track members. The two tracks are attached to a grid matrix of launch tubes skewed facing forward and outward with cross members at right angles to these tubes. Two levels of tubes are employed in this arrangement, as are two exit ports. However, if desired, a single level of tubes or multiple rows of more than two may be provided, depending upon tube diameter. A drive mechanism is provided, comprising a drive motor having a pinion gear which engages a track-mounted rack gear. For the missile length selected for this arrangement, two such sets of launching arrangements, one on each side, can be installed on one aircraft.

In accordance with one particular aspect of the invention, all components of the system are sized to pass through a passenger door opening (typically 42"×76" for a widebody aircraft), thus providing the capability for the launcher system of rapid modification of a commercial aircraft without the necessity of structural change.

Missile ejection is achieved by using gas stored in an accumulator which is located near the rear end of the missile tube at the launching position. This accumulator is pressurized to approximately 100 psi before being vented into the base of the tube. The source of the pressurized gas is preferably a compressor used to pressurize the accumulator. Alternatively, gas generator cartridges may be employed which, when burned, provide pressurized gas to the accumulator. The rocket motor of the missile which is ejected from the aircraft using the pressurized gas ejection system is not ignited until the missile is completely outside and clear of the aircraft, thus eliminating the need for any exhaust gas control system. After missile launch, the airlock valve is closed and the missile launch tube is unsealed and moved to make room for the next launch tube to be aligned with the exit port and pressure sealed for the next launch. The missiles are ejected nose first and the launch ports are oriented so that the missiles are ejected forwardly and to the side of the aircraft. Elevation of the forward end of the launch tube serves to direct the missile, as ejected, to pass upward and insures clearance of the aircraft wing and tail. Alternatively, if appropriate for a particular type of aircraft, the inclined angle in the support frame can be reversed so that the forward end of the launch tube is downward to direct the missile below the aircraft wing and tail when ejected.

BRIEF DESCRIPTION OF THE DRAWING

A better understanding of the present invention may be had from a consideration of the following detailed description, taken in conjunction with the accompanying drawing in which:

FIG. 1, views A, B and C representing front, side and top views, respectively, shows the radar coverage and missile ejection path provided by an arrangement of the present invention as installed in a commercial aircraft;

DESCRIPTION OF THE PREFERRED EMBODIMENT

Figure 2B:
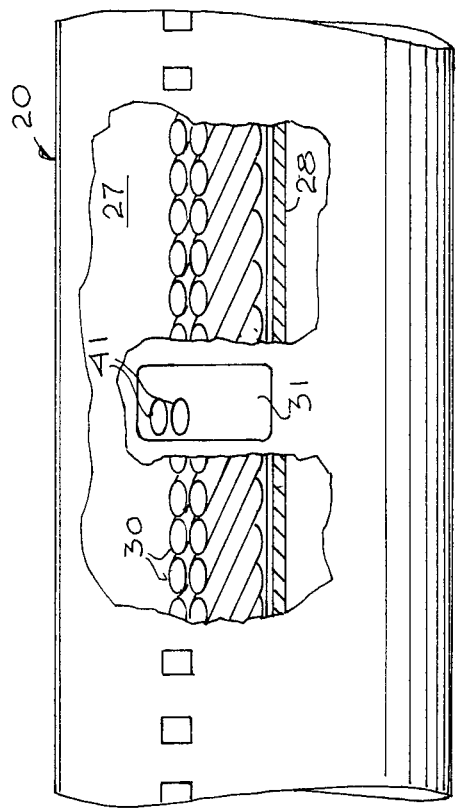
FIG. 2 shows three views A, B and C, respectively a cross section of the aircraft (looking aft), a side view and top view, partially broken away, of the interior of the passenger compartment of the aircraft of FIG. 1 having the missile launcher of the present invention installed therein.

Referring to FIG. 1, there is shown a commercial aircraft 20 in which may be installed the missile system of the present invention. Typical of the aircraft in which the present invention may be installed are widebody aircraft such as the DC-10 and L-1011.

For the purposes of this description, a semi-active, interrupted continuous wave (ICW) guidance system constitutes an example of the fire control radar system utilized with the present invention. This system provides for approximately 125° azimuthal coverage on each side of the aircraft 20. Three fixed, electronically-phase-steered radar antennas are employed. The first is installed in the nose of the aircraft 20 in place of the normally present weather radar antenna. The radome covering the weather radar antenna is replaced with a new radome which is matched to the radar system frequency. Side coverage from approximately 30° to 125° is provided by installing radar antennas, one on each side at the positions of the forward doors 22 of the aircraft 20. A mounting frame which also comprises a pressure bulkhead and which is substantially identical to the existing doors 22 of the aircraft 20 is installed in place thereof. The side-facing antenna installation consists of a mounting frame/pressure bulkhead structure which mounts to the door frame of the forward passenger door. On the right-hand side of the aircraft, the emergency exit doorway is used. In some aircraft, the passenger doors open up into a space within the fuselage above the interior ceiling. In these aircraft, the door can the locked in the open position and the pressure bulkhead structure mounted in the doorway. In other aircraft where the doors hinge out, these doors are removed before mounting the bulkhead structure. As shown in FIG. 1, the radar system provides for approximately 250° azimuthal coverage in order to direct missile launch. In addition the system provides for approximately −10° to +25° vertical coverage over this 250° azimuthal coverage.

Although a semi-active ICW guidance system is contemplated for use with the present invention, other radar systems as are known in the prior art may also be similarly employed. The disclosed radar system has a size which allows it to be installed within the passenger compartment without requiring structural modifications to the aircraft. The existing air conditioning systems of widebody type airliners are capable of removing the heat output from a 4 kw average output transmitter, such as is used in the avionics system. Suitable radar systems which may be employed in the present invention are well known in the art and therefore need not be described further. The radar system used does not constitute a part of this invention.

The missile launcher of the present invention is installed in the interior of the passenger compartment of the aircraft 20, again without structural modification of the aircraft. The deck of the compartment has all seats, partitions, and the like removed so as to provide a completely empty interior of the aircraft 20. In large commercial aircraft such as DC-10s, 747s and L-1011s, four sets of exit doors (including emergency exits) are provided as shown in FIG. 1. The present invention contemplates ejection of the missiles from the second set of doors, indicated as mid-section doors 23 in FIG. 1. However, the wing doors may be employed instead, if required, but this may pose a potential safety problem due to their location over the wings of the aircraft 20. FIG. 1 shows the ejection path of a missile ejected from the interior of the aircraft 20. The ejection path is indicated by the arrow 24.

Figure 2C:
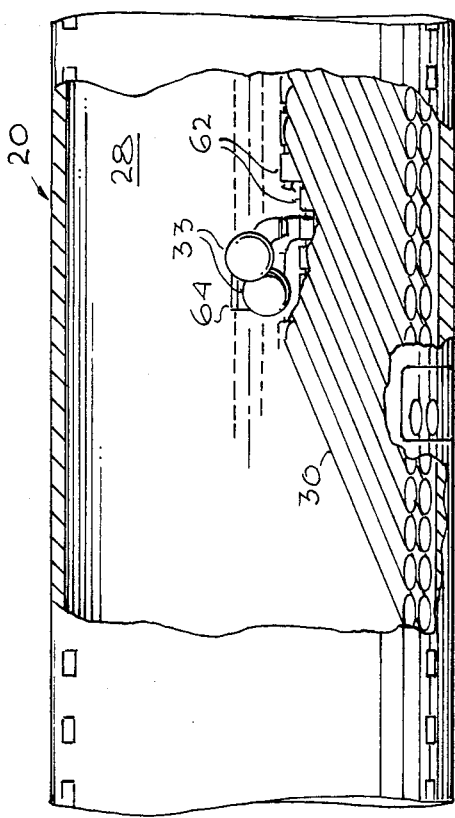
Figure 2A:
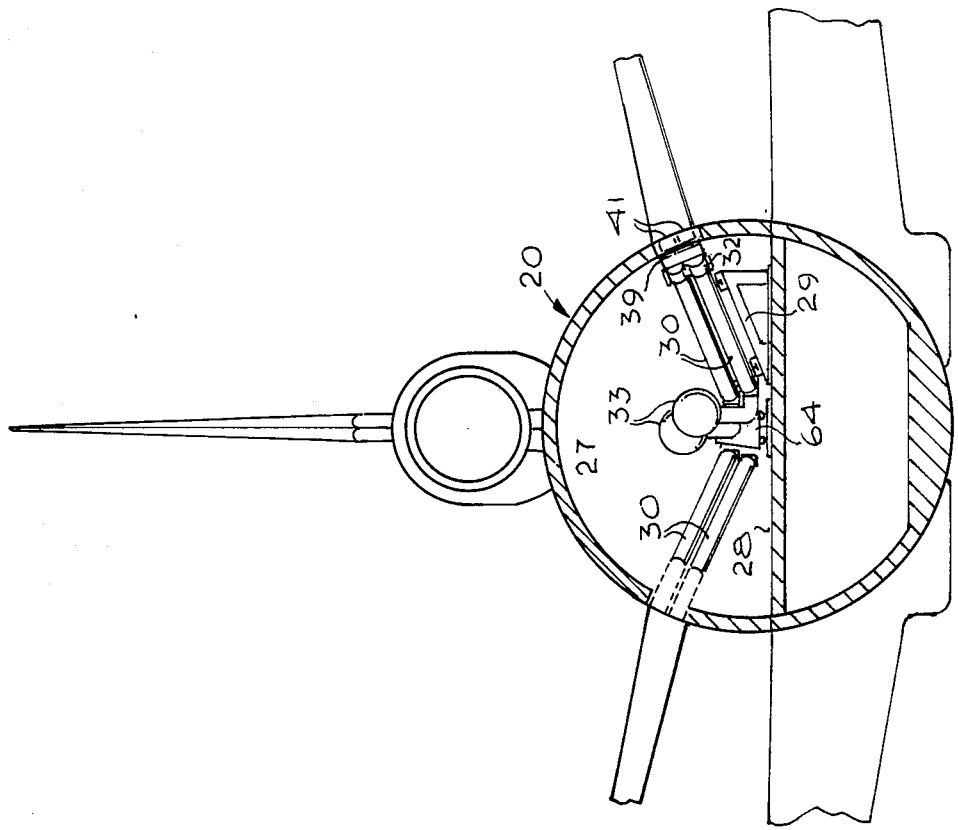

Referring to FIG. 2, cutaway views of the passenger compartment 27 of the aircraft 20 are illustrated, showing the installation of the missile launcher of the present invention therein. FIG. 2A shows a view of the passenger compartment 27 looking aft. The passenger compartment 27 has a frame arrangement 29 mounted therein on which is disposed a plurality of missile launch tubes 30. The missile launch tubes 30 are shown coupled to a bulkhead arrangement 31 which has a slidable collar 32 and valve arrangement 39 mounted near the exit ports 41. The slidable collar 32 is adapted to slide over the end of the launch tubes 30 when in proper alignment therewith.

The launch tubes 30 are disposed at a predetermined angle of inclination defined by the frame arrangement 29. Gas ejection apparatus 33, such as may be provided by a compressor and accumulator arrangement to supply a cold gas, or by using a gas generator cartridge which is ignited to produce a hot gas, may be employed. The gas ejection apparatus is coupled to the rear end of the launch tube 30 in order to provide sufficient pressure to the interior thereof to eject a missile from the tube 30.

FIGS. 2B and 2C show side and top views, respectively, of the compartment 27. The general orientation of the launch tubes 30 is shown relative to the centerline of the aircraft and the deck 28 of the compartment 27.

Figure 3:
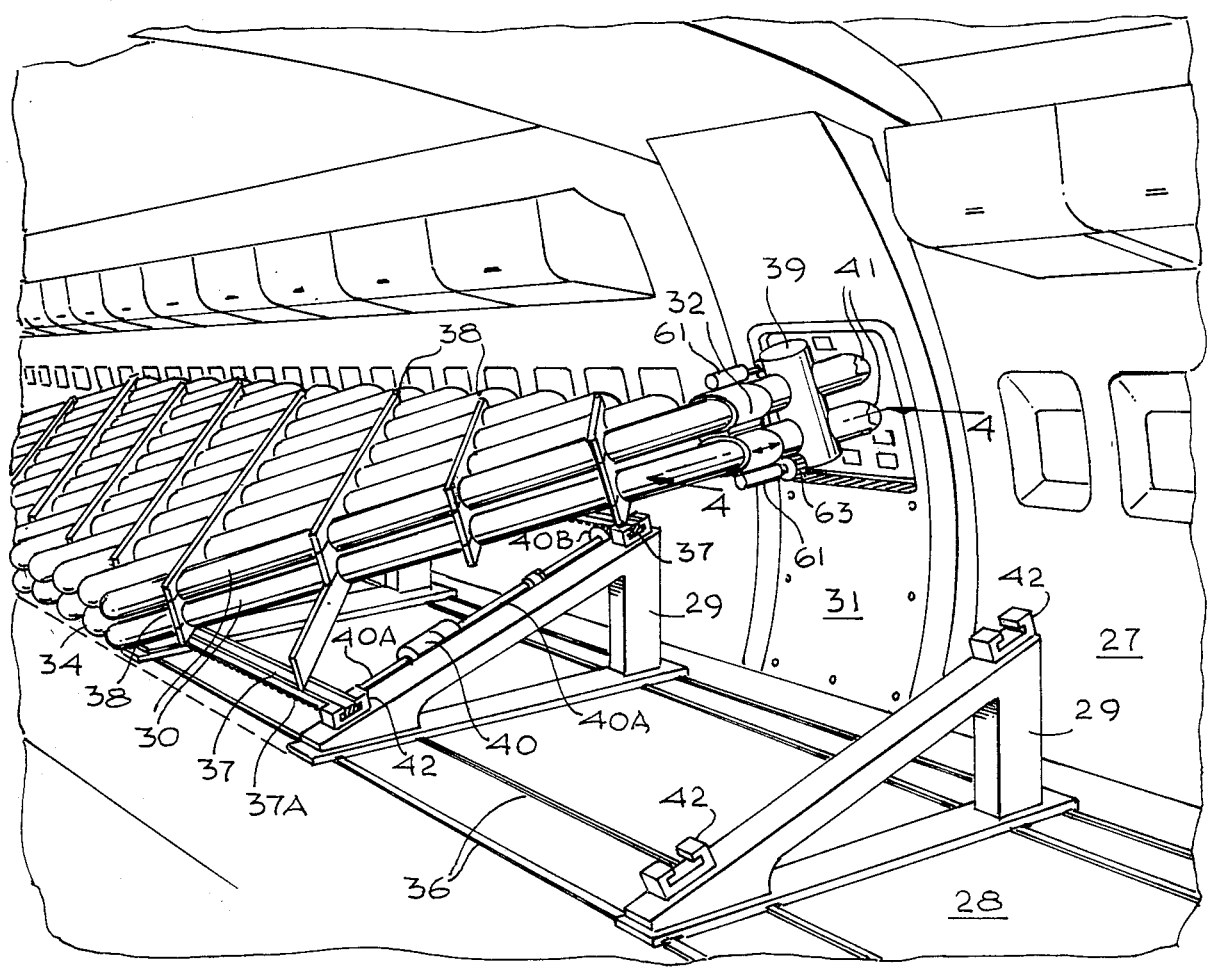
FIG. 3 is a perspective view showing details of the missile launcher of the present invention installed in the interior of the passenger compartment of the aircraft.

The missile launcher of the present invention is illustrated in more detail in FIG. 3 which shows the interior of the compartment 27 having an empty compartment deck 28. Seat tracks 36 are generally provided in the aircraft 20 which may be utilized as supporting structure for the inclined frames arrangement 29. The frame 29 may be mounted to the seat tracks 36 in a conventional manner. Attached to the inclined frame 29 are bearing blocks 42 which provide a bearing surface for sliding longitudinal tracks 37. Support structures 38 are attached to the sliding tracks 37. This support structure 38 is designed to hold and support a plurality of launch tubes 30.

The launch tubes 30 are disposed on the tracks 37 so that they are contiguous to each other in a linear arrangement. The tubes 30 are mounted in cross supports of the support structure 38 in a manner such that they face forward and to the side of the compartment 27 in a predetermined direction and at an inclination defined by the inclination angle of the frame 29. Each individual support member 38 is formed of three sections—a lower section having a plurality of U-shaped cutouts, a middle section having U-shaped cutouts along both of its upper and lower edges, and an upper section having a plurality of U-shaped cutouts along its lower edge. All of these cutouts are dimensioned and located to match the outer diameter of the launch tubes 30 and serve to hold the launch tubes in a rigid array when the launch tubes and support members are assembled after the individual components are placed on board the aircraft through a passenger door opening. A drive mechanism 40 comprising a motor and gearbox is provided to drive the track arrangement along the inclined frames 29 through the bearing blocks 42. The bearing blocks 42 are of conventional recirculating ball design, oriented to allow sliding motion parallel to the aircraft's longitudinal axis. The drive mechanism 40 includes drive shafts 40A coupled to respective pinion gears 40B which engage toothed racks 37A on the undersides of the longitudinal tracks 37. This drive mechanism serves to move the entire assembly incrementally along the tracks so that successive launch tubes are presented in alignment with the exit ports 41 for the launching of the missiles therein.

Figure 4:
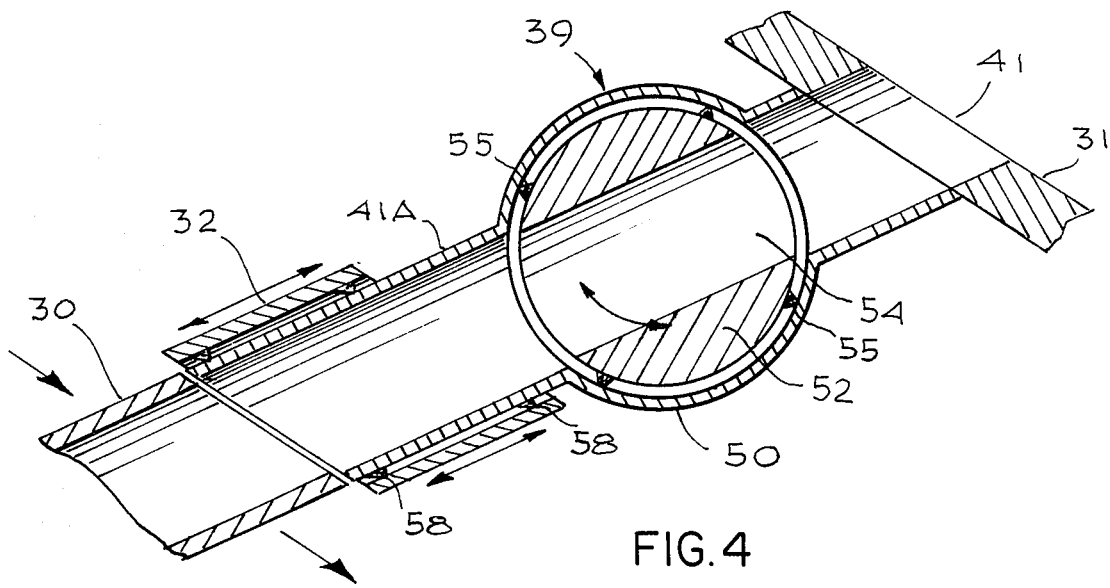
FIG. 4 is a sectional view, taken along the line 4—4 of FIG. 3, showing particular details of the air-lock valve and the seal at the exit ports.

The bulkhead arrangement 31 is shown in detail in FIGS. 3 and 4 and comprises a pair of exit ports 41 which extend outwardly from the passenger compartment 27. The airlock valve 39 is attached to the bulkhead arrangement 31, and is coupled to the exit ports 41. A sliding collar 32 which comprises a seal arrangement is disposed on the inside portion of the valve 39. This sliding collar 32 is adapted to slide over the ends of the launch tubes 30 when they are aligned in proper position with the bulkhead arrangement 31 and exit ports 41. The sliding collar 32 slides over the end of the tubes 30 in order to provide a pressure seal between the adjacent launch tubes 30 and the tubes leading to the valve 39 and exit ports 41. In addition, the sliding collar 32 insures that the launch tubes are properly aligned with the exit ports so that the missiles contained within the launch tubes 30 will be properly ejected from the aircraft 20. The pressurization apparatus is not shown in FIG. 3, but a pressure accumulator fitting 34 is shown at the rear end of the launch tubes 30 which provides a means by which the interior of the rear end of the tubes 30 may be pressurized so as to launch missiles therefrom.

The horizontal rack of launch tubes 30 is designed to allow a large number of missiles to be carried and ejected from the aircraft 20. The launch tubes are positioned in an array extending longitudinally along one side of the fuselage of the aircraft 20 in a manner which allows for sequential alignment of the tubes with the bulkhead arrangement 31, and with exit ports 41 in particular. The sliding collar 32 is adapted to provide an airtight seal between the launch tubes 30 and the exit ports 41 prior to opening of the valve 39.

Details of the airlock valve 39 and missile tube seal 32 are shown in the sectional view of FIG. 4. As shown, the airlock valve 39 is a cylindrical rotary valve having an outer housing 50 and a rotatable core member 52. The core 52 has a central bore 54 which is sized to the internal diameter of the missile tube 30. The core member 52 is rotatable through 90° between opened and closed positions under control of an actuator (not shown) within the housing 50. This actuator may be a rotary solenoid or a pneumatic or hydraulic actuator, as desired, all of which are standard mechanisms well known in art. In the open position as shown, the core member 52 and bore 54 provide an opening for the missile from the launch tube 30 to exit the aircraft through exit port 41 upon ejection. When closed (rotated 90° counterclockwise) the core member 52 blocks the path to the exit port 41 and seals off the opening to the exit port 41. A plurality of wipers 55 (four are shown) are mounted on the outer surface of the core member 52, rotating with the member 52 to perform this sealing function. Thus the airlock valve 39 is enabled to maintain the aircraft's internal pressurization when a missile is not being launched.

The sliding collar seal 32 is movable longitudinally by associated actuator assemblies to engage the outboard ends of the particular launch tubes 30 which are in alignment with the exit ports in order to seal the small space between the end of the launch tube and the adjacent tube section coupled to the airlock valve 39 and exit ports 41. The sliding collar actuator assemblies are shown in FIG. 3 as comprising a pair of motors 61 mounted on opposite sides (top and bottom) of the figure 8-shaped sliding collar 32 and driving spiral screw elements engaging the blocks 63 which are mounted on the inboard ends of the exit port tubes 41. Other types of actuating mechanisms may be used, if desired, such as pneumatic or hydraulic actuators, for example. Inside each of the two circular openings of the collar 32 is a pair of O-ring seals 58 which slide along the outer surfaces of the tube 41A and launch tube 30. After the sliding collar seal 32 is in sealing position (moved inboard to bridge the space between the launch tube 30 and the associated tube 41A) the airlock valve 39 is rotated to the open position and the system is ready for missile ejection. After ejection of the pair of missiles from the two launch tubes 30 which are in alignment with the exit ports 41, the airlock valve 39 is rotated to the closed position, the sliding collar 32 is retracted, and the launch tube assembly is ready for indexing to the next launch position.

Figure 5:
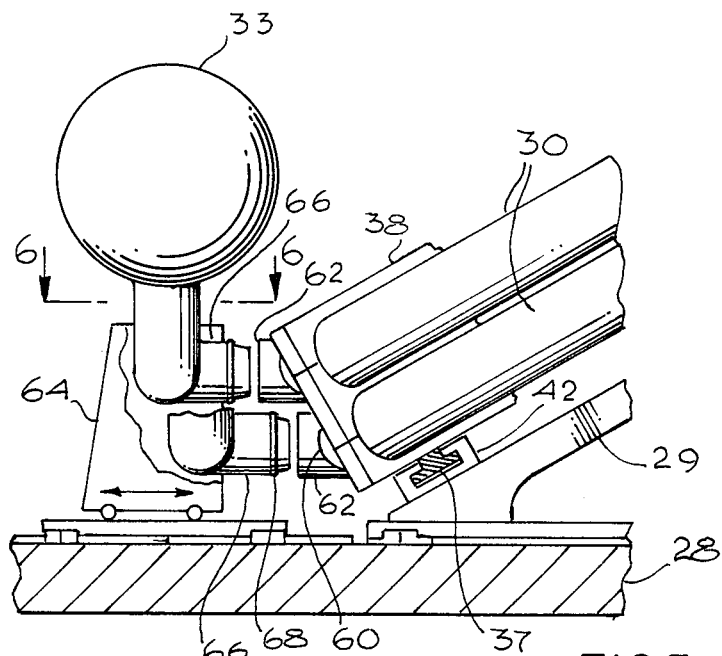
FIG. 5 is a schematic elevational view, partially broken away, showing the air accumulators for providing the pressure to eject a missile from a launch tube.
Figure 6:
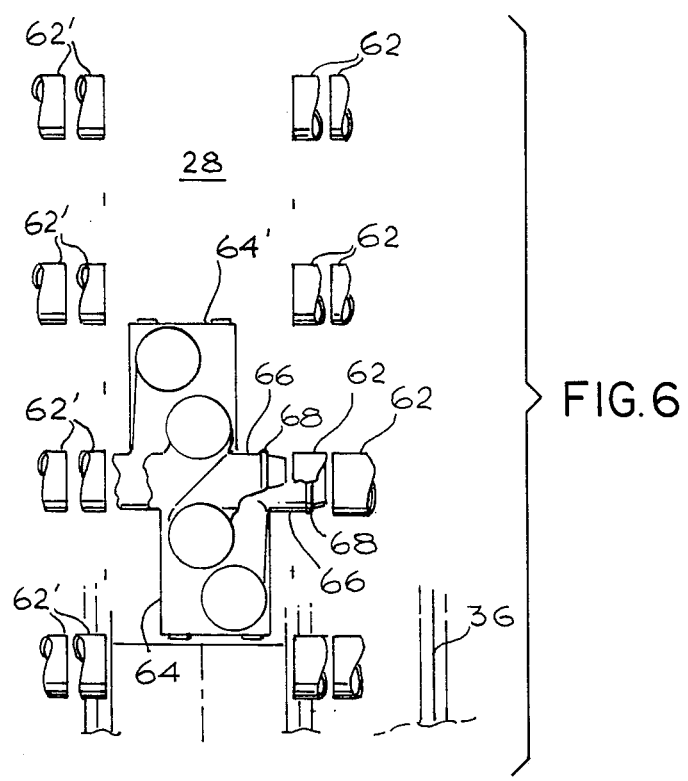
FIG. 6 is a plan view, in section, taken along line 6—6 of FIG. 5.

Particular details of the gas pressurization system for ejecting the missiles from the launch tube 30 are shown in FIGS. 5 and 6. Each pair of launch tubes 30 is coupled at their lower ends to a manifold box 60 which provides manifolding between air inlet tubes 62 and the associated individual launch tubes 30. At the launch position, a pair of accumulators 33 (one is shown partially broken away in FIG. 5) are mounted on an accumulator carriage 64 which is movable transversely, that is, toward and away from engagement with the tubes 62. (These elements have been omitted from FIG. 3 for purposes of clarity). The lower end of each accumulator 33 is provided with an outlet tube 66 having a tapered nose and O-ring seal 68 for coupling to the tubes 62 in sealing relationship when the accumulator carriage 64 and its accumulators 33 with tubes 66 are moved to engage the tubes 62 in preparation for missile ejection. The schematic plan view of FIG. 6, from which alternate sets of coupling tubes 62 have been omitted for simplicity, shows the arrangement of FIG. 5 as set up for pressurizing launch tubes on both sides of the aircraft. The tubes on the other side of the aircraft are designated 62' and the accumulator carriage for that side is designated 64'.

The accumulators 33 are pressurized to approximately 100 psi via couplings to a pressurized gas source (not shown), preferably located in the rear of the aircraft. This may comprise a plurality of tanks which are charged on the ground or it may comprise one or more on-board compressors. The accumulators 33 for one side of the aircraft are undergoing pressurization while the accumulators on the other side of the aircraft are in readiness or are being used to launch the missiles on the other side of the aircraft.

An an alternative to the accumulator arrangement described hereinabove, each individual launch tube may be provided with its own dedicated accumulator which can be pressurized long before use, or attached to a hot gas charging cartridge. Suitable valves, similar to the airlock valve 39, may be provided at the outlet of each accumulator to control the pressurization of the breech end of the associated launch tubes 30. Pressurized gas systems for catapulting or ejecting missiles from launch tubes are well known in the prior art. Examples are found in U.S. Pat. Nos. 2,989,899 of Siegel et al, 3,583,277 of Crockett and 4,012,985 of Magnusson. The disclosures of these patents are incorporated herein by reference and resort may be had to these disclosures for any details of such systems which may be desired.

Figure 7:
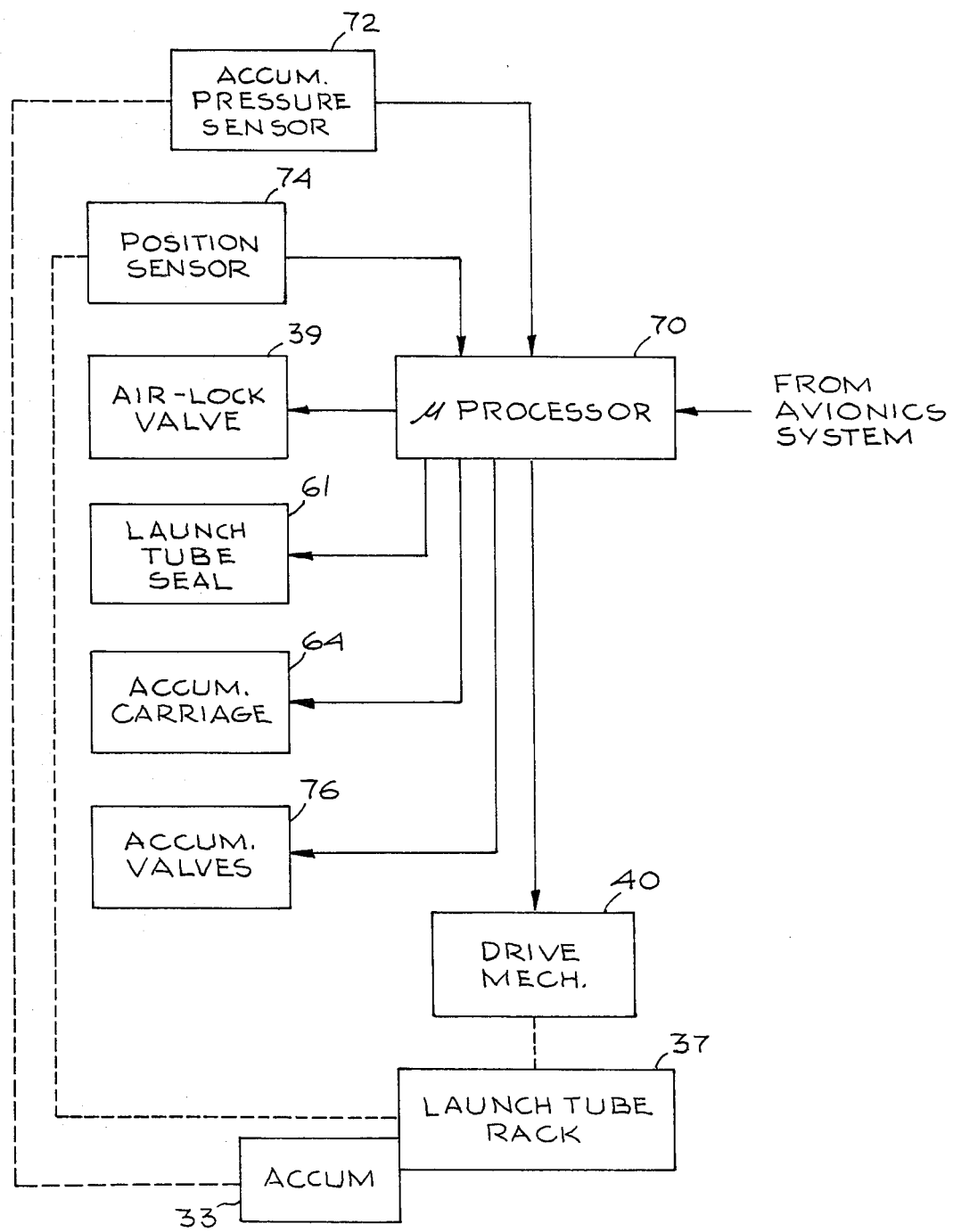
FIG. 7 is a block diagram representing the control system operation for embodiments of the present invention.

In the preferred embodiment of the present invention as shown and described herein, the missile launch system is controlled by a microprocessor, although other arrangements are possible. FIG. 7 is a block diagram of the control arrangement and shows a microprocessor 70 coupled to receive various input signals and to send corresponding actuation signals to various parts of the system. In FIG. 7, the microprocessor is shown coupled to receive signals from an accumulator pressure sensor 72 and a position sensor 74. These are in turn coupled respectively to the accumulator 33 and launch tube rack 37. The pressure sensor 72 senses the pressure in an individual accumulator 33 to insure that the ejection system is not enabled until adequate pressure is available in the accumulator. The position sensor 72 senses the position of the launch tubes and provides an ENABLE signal when a given pair of launch tubes is in alignment with the exit ports 41. The position sensor may, for example, comprise one or more position sensing switches mounted near the exit ports to indicate when a launch tube is directly aligned with the exit port. In response to the signals from the position sensors 74, the microprocessor 70 controls the drive mechanism 40 (see FIG. 3).

The microprocessor 70 is also coupled to provide control signals to the airlock valve 39, the actuator motor 61 of the launch tube sealing collar 32, the accumulator carriage 64 and the accumulator valves 76. The control processor logic of the microprocessor 70 is set up so that the sliding collar seal can only be energized when a launch tube is properly indexed, and the airlock valve can only be opened when the sliding collar is sealed. Similarly, gas pressure from missile ejection can only be applied to the aft end of the launch tube if the airlock valve is in the open position. Thus, in response to the ENABLE signal from the position sensor 74, the microprocessor 70 actuates sliding collar drive mechanism 60 and the accumulator carriage 64. Thereafter, the airlock valve 39 is activated to move to the open position. Upon receiving an ENABLE signal from the accumulator pressure sensor 72, the microprocessor 70 sends an ACTIVATE signal to the accumulator valve 76 which will pass air under pressure from the accumulator 33 to the breech of the launch tube 30, thereby ejecting the selected missile. The operation of the launch system is initiated by a signal applied to the microprocessor 70 from the target acquisition radar of the associated avionics system.

For missiles up to approximately 10" in diameter and approximately 180" in length, two launch mechanisms (one on each side) can be installed in a widebody type aircraft. The various sensors and activators of the control system of FIG. 7 would be duplicated for the duplicate launchers. The microprocessor 70 would control various accumulator valves 76 so that the accumulators on one side would be in readiness while the accumulators on the other side (just launched) would be brought up to pressure. For missiles up to approximately 20" in diameter and up to approximately 20' in length, a single launching system may be used with missile ejection from only one side of the aircraft. In any case, however, all of the components making up the system can be brought on board through existing door openings in the aircraft and assembled within the fuselage (after the seats and other equipment normally installed in a commercial airliner have been removed). Following assembly and installation of the missile launch system within the aircraft, the launch tubes may be loaded with missiles by inserting the missiles through the exit ports as the respective launch tubes are indexed along the traverse path of the system. If preferred, the missiles can be installed in the launch tubes before bringing the launch tubes on board the aircraft.

The missile launcher of the present invention contemplates the launching of smooth bore tube-launched missiles. The angular direction of the missile launch is not absolutely critical, but has been chosen to provide adequate clearance distances for safety of the aircraft 20 in the event that the missile propulsion system does not operate after ejection. Two rows of missile launch tubes 30 have been shown. However, any number of launch tubes 30 may be employed which is compatible with the bulkhead arrangement 31 and the size of the missiles employed. Clearly, a smaller size missile would allow for the use of a larger number of launch tubes within the same space.

Thus there has been provided a missile system which may be employed in a standard commercial passenger aircraft, which requires no major aircraft modifications and which may be quickly installed in times of national emergency, or the like. The present invention comprises hardware which is sized to fit through a normal aircraft door so as not to require modification of the aircraft for installation of the system. The present invention allows for the launching of a plurality of missiles from the interior of the aircraft in a sequential manner while maintaining the structural integrity of the aircraft. One particular arrangement of the present invention, designed for installation in a DC-10 aircraft, provides for the transport and launching of 56 missiles, 28 on each side of the aircraft. The system is designed to achieve the launching of missiles at the rate of one missile per second, if desired.

Although there have been described above specific arrangements of a quick conversion missile system for widebody aircraft in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

We claim:

1. A missile launching system for use in commercial aircraft havin a passenger compartment, said missile launching system comprising:
   a support structure slidably disposed in said compartment;
   a plurality of launch tubes disposed on said support structure, said tubes being contiguous to one another in a generally parallel array and being linearly disposed along a lengthwise portion of said compartment at a predetermined angular orientation to the axis of said aircraft;
   a bulkhead member for mounting in a pre-established opening in the fuselage of said aircraft having at least one exit port and one exit tube for coupling to said launch tubes in succession;
   sequentially actuable drive means for moving the launch tubes into alignment with the exit tube and exit port in succession; and
   means for selectively ejecting a missile from the launch tube which is in alignment with the exit tube and exit port.

2. The system of claim 1 wherein the system structure is assembled from individual components placed on board the aircraft through a pre-established passenger door opening.

3. The system of claim 1 wherein the launch tubes are positionable for loading in succession with missiles placed on board the aircraft through the exit port and exit tube.

4. The system of claim 1 further comprising a plurality of frame members and a track slidably coupled to the frame members therefor.

5. The system of claim 4 wherein each of the individual frame members is adapted for installation in the standard seat anchoring tracks of the aircraft.

6. The system of claim 4 wherein the support structure includes a plurality of detachable mounting members for affixing the launch tubes in a rigid array.

7. The system of claim 6 wherein the frame members, the mounting members, the launch tubes, and all other components of the system are individually sized for placing on board the aircraft through an established passenger door opening.

8. The system of claim 6 wherein the detachable mounting members comprise separate sections, each having U-shaped cutouts to receive the launch tubes therein.

9. The system of claim 8 wherein the launch tubes are arrayed in two rows, one above the other, and the detachable mounting members comprise three sections, a lower section having U-shaped cutouts along its upper edge, an intermediate section having U-shaped cutouts along both upper and lower edges, and an upper section having U-shaped cutouts along its lower edge, all of the cutouts being dimensioned to match the outer diameter of the launch tubes.

10. The system of claim 1 wherein the bulkhead member includes selectively operable valve means for controlling an opening in line with the exit port, the valve means being operable to seal off the opening except when a missile is to be ejected.

11. The system of claim 10 wherein the ejecting means includes means for selectively pressurizing the breech of a launch tube to eject the missile therein through the exit port.

12. The system of claim 11 further including a retractable member for selectively coupling the exit tube and a launch tube aligned therewith in sealing relationship.

13. The system of claim 11 wherein the gas pressurizing means comprises an accumulator for providing compressed air to the breech of the launch tube.

14. The system of claim 15 wherein the accumulator is positioned opposite the exit port and is selectively movable into engagement with the breech of a launch tube that is aligned with the exit port.

15. The system of claim 14 further including control means responsive to position sensing signals indicative of the movement of a launch tube into aligned position with the exit port for actuating the valve means, the retractable sealing means and the movable accumulator into positions for launching a missile.

16. The system of claim 15 wherein the control means further includes means for sensing the gas pressure in the accumulator to withhold actuation of said elements until the pressure reaches a predetermined level.

17. The system of claim 16 wherein the control means further includes means for actuating the drive means to advance to the next launch tube position after a missile has been launched.

18. The system of claim 17 wherein the control means is operative to retract the retractable means from engagement with the launch tube, close the valve means, and retract the movable accumulator from coupling to the breech of the launch tube prior to causing the drive means to advance the launch tubes to the next position.

19. A missile launcher for use in a commercial aircraft having an empty passenger compartment, said launcher comprising:
an inclined frame assembly disposed in said passenger compartment and having a predetermined angle of inclination;
a slidable track arrangement slidably coupled to said inclined frame assembly;
a plurality of missile launch tubes disposed on said track arrangement so as to be contiguous with one another in a generally planar array and oriented to face forward and to the side of said compartment in a predetermined direction and at said predetermined angle of inclination, each of said tubes having at least one open end; and
bulkhead means disposed in a pre-established opening in the fuselage of said aircraft for successively coupling to the open end of said launch tubes, the bulkhead means having an opening providing an exit port through which missiles can be launched.

20. The missile launcher of claim 19 wherein said bulkhead means comprises valve means for selectively providing a passageway to the exit port, and a sealing arrangement coupled to said valve means for slidably coupling said valve means to an adjacent launch tube in sealing relationship.

21. The missile launcher of claim 20 further comprising gas ejection means for selectively coupling to said launch tubes for pressurizing said tubes to eject a missile therefrom.

22. The missile launcher of claim 21 further comprising drive means coupled to advance said track arrangement along said frame assembly to successively align each of said launch tubes with said exit port to permit launching of missiles from each of said launch tubes in succession.

23. The method of installing a missile launching system within the passenger compartment of a standard commercial aircraft without the necessity of modifying the aircraft's structure comprising the steps of:
removing the passenger seats from the aircraft;
placing all of the components making up the system on board the aircraft through a pre-existing passenger door opening;
assembling a frame arrangement by mounting individual frame members to the tracks provided for anchoring the passenger seats;
installing in bearing elements mounted on the individual frame members a plurality of track members for longitudinal movement relative to the aircraft;
placing a plurality of launch tubes in launch tube mounting members in position on the track members to form a rigid array movable therewith; and
installing a prefabricated bulkhead in a pre-existing fuselage opening, the bulkhead having means defining an exit port, a valve controlling a passageway accessing the exit port and a slidable coupling member for sealing the passageway from the exit port to an adjacent launch tube.

24. The method of claim 23 further including the steps of installing the launch tube mounting members in sections by affixing a lower tube mounting member section having a plurality of U-shaped cutouts along its upper edge to the track members and attaching an upper section having U-shaped cutouts along its lower edge to the lower section after placing a plurality of launch tubes in the U-shaped cutouts.

25. The method of claim 23 further including the step of mounting a pressurized gas source at the missile launch position opposite the bulkhead.

26. The method of claim 25 wherein said last-mentioned step includes mounting the pressurized gas source on a carriage which is movable into engagement with the breech end of the adjacent launch tube in the launch position.

27. The method of claim 25 further including the steps of advancing the array of launch tubes to move a selected launch tube into the launch position in alignment with the exit port, opening the valve, advancing the slidable coupling member into sealing relationship with the launch tube, and moving the gas source into sealed coupling relationship with the breech of the launch tube in preparation for launching.

28. The method of claim 27 further including the step of transferring the pressurized gas from the gas source into the breech of the launch tube to eject the missile therefrom in a trajectory which is directed to clear the external structure of the aircraft.

29. The method of claim 28 further including the steps of closing the valve, disengaging the coupling member from the adjacent launch tube, and uncoupling the gas source from the breech of the launch tube following ejection of the missile therefrom.

30. The method of claim 29 further including the step of advancing the array of launch tubes after a missile has been launched to bring the launch tube containing the missile to be launched next into alignment with the exit port and gas source.

* * * * *